United States Patent
Mashino

(10) Patent No.: US 7,394,179 B2
(45) Date of Patent: Jul. 1, 2008

(54) ALTERNATOR HAVING A SLIP-RING COVER CONNECTED TO BRUSH HOLDER

(75) Inventor: Mikio Mashino, Kariya (JP)

(73) Assignee: Denso Corporation, Kariya (JP)

( * ) Notice: Subject to any disclaimer, the term of this patent is extended or adjusted under 35 U.S.C. 154(b) by 129 days.

(21) Appl. No.: 11/131,422

(22) Filed: May 18, 2005

(65) Prior Publication Data

US 2005/0280330 A1    Dec. 22, 2005

(30) Foreign Application Priority Data

Jun. 16, 2004    (JP)    ............... 2004-177970

(51) Int. Cl.
   *H02K 13/00*    (2006.01)
   *H01R 39/38*    (2006.01)
(52) U.S. Cl. .................. 310/239; 310/88; 310/232; 310/58
(58) Field of Classification Search .......... 310/219, 310/239, 240, 241.242, 243, 244, 245, 232, 310/88

See application file for complete search history.

(56) References Cited

U.S. PATENT DOCUMENTS

| 4,293,788 | A |   | 10/1981 | Blinder |         |
|-----------|---|---|---------|---------|---------|
| 4,384,225 | A | * | 5/1983  | Iwaki et al. | 310/88 |
| 4,959,576 | A | * | 9/1990  | Horibe et al. | 310/239 |
| 5,296,772 | A | * | 3/1994  | Bradfield et al. | 310/242 |
| 6,020,662 | A | * | 2/2000  | Chen et al. | 310/65 |
| 6,294,856 | B1 | * | 9/2001 | Ishida et al. | 310/232 |
| 6,486,584 | B2 | * | 11/2002 | Chang | 310/239 |
| 6,664,699 | B2 | * | 12/2003 | Shioya et al. | 310/239 |
| 6,710,499 | B2 |   | 3/2004  | Tsuge |         |
| 2002/0047470 | A1 | * | 4/2002 | Shioya et al. | 310/239 |
| 2002/0140314 | A1 | * | 10/2002 | Tsuge | 310/239 |
| 2003/0160534 | A1 | * | 8/2003 | Tsuge et al. | 310/239 |
| 2005/0280330 | A1 | * | 12/2005 | Mashino | 310/239 |

FOREIGN PATENT DOCUMENTS

| EP | 0 318 009 A2 | 5/1989 |
| JP | A-60-2051 | 1/1985 |
| JP | A-60-5750 | 1/1985 |
| JP | A-1-138952 | 5/1989 |
| JP | A-5-153750 | 6/1993 |
| JP | A-2000-32720 | 1/2000 |
| JP | 2000228841 A * | 8/2000 |

* cited by examiner

*Primary Examiner*—Karl I Tamai
(74) *Attorney, Agent, or Firm*—Oliff & Berridge, PLC

(57) ABSTRACT

An automotive alternator has slip-rings connected to a rotor shaft and a brush device covering the slip-rings. The brush device is composed of a brush holder supporting brushes therein and a slip-ring cover firmly connected to the brush holder. The slip-ring cover includes a wall curved in a U-shape and a pair of flat walls closing the axial ends of the curved wall. Openings for ventilating the brushes and the slip-rings are formed between the curved wall of the slip-ring cover and the sidewalls of the brush holder. When the brushes are positioned downward of the slip-rings, the openings are open to the downward of the slip-rings. Therefore, water is prevented from entering into the brush device through the openings.

4 Claims, 9 Drawing Sheets

FRONT SIDE ←→ REAR SIDE

ALTERNATOR HAVING A SLIP-RING COVER CONNECTED TO BRUSH HOLDER

CROSS-REFERENCE TO RELATED APPLICATION

This application is based upon and claims benefit of priority of Japanese Patent Application No. 2004-177970 filed on Jun. 16, 2004, the content of which is incorporated herein by reference.

BACKGROUND OF THE INVENTION

1. Field of the Invention

The present invention relates to an alternator to be mounted on an automotive vehicle.

2. Description of Related Art

It is important, in an automotive alternator, to prevent abnormal abrasion of slip-rings caused by water, oil or foreign particles entering onto a sliding surface of the slip-rings. It is also important to exhaust brush powders to suppress heat generated by abrasion. For these purposes, JP-A-2000-139058 proposes an alternator having a brush device, in which a separating wall formed in a slip-ring cover is inserted into a depressed portion formed in a brush holder. A ventilation passage is surely secured in this brush device because the ventilation passage is formed by a resin material, of which the brush holder and the slip-ring cover are made, without using deformable sealing rubber. JP-A-2002-359951 proposes another alternator that includes a slip-ring cover having a ventilation window in a peripheral wall surrounding the slip-rings. In this brush device, no ventilation opening is formed at an axial end of a brush holder.

In the alternator proposed in JP-A-2000-139058, however, an axial length of the brush device becomes long because the depression has to be formed in the brush holder at its axial end. In the alternator shown in JP-2002-359951, it is difficult to prevent water from entering into the brush device because the ventilation opening is formed on the peripheral wall of the slip-ring cover. If brushes are positioned downward of the slip-rings, water easily enters into a space containing the brushes. Further, there has been a problem that water sneaks-in due to interfacial tension from a portion where the brush holder contacts the slip-ring cover, even if water does not directly enters from the peripheral opening.

SUMMARY OF THE INVENTION

The present invention has been made in view of the above-mentioned problems, and an object of the present invention is to provide an improved alternator having a brush device that is able to prevent foreign particles and water from entering the brush device when the brushes are positioned downward of the slip-rings. Another object of the present invention is to make the brush device small in size.

The automotive alternator includes slip-rings connected to a rotor shaft and a brush device containing brushes slidably contacting the slip-rings and covering an outer circumference of the slip-rings. The brush device is composed of a brush holder supporting the brushes therein and a slip-ring cover. The brush holder and the slip-ring cover are connected to each other to form the brush device as a unitary body. The slip-ring cover is composed of a curved wall formed in a U-shape and a pair of flat walls closing axial ends of the curved wall. Through-holes are formed in flat walls, and projections are formed on sides of the brush holder so that the projections engage with the through-holes when the brush holder is connected to the slip-ring cover.

Before connecting the brush holder to the slip-ring cover, a stopper rod for pushing the brushes into the brush holder is inserted into the through-holes. The brush holder is inserted into the slip-ring cover, and both are connected to each other by making engagement between the projections formed on the brush holder and the through-holes formed in the flat walls of the slip-ring cover. Then, the brush device composed of the brush holder and the slip-ring cover is mounted on an alternator so that the slip-rings are covered with the brush device. After the brush device is mounted on the alternator, the stopper bar is taken out to thereby make the brushes slidably contact the slip-rings.

Ventilation openings are formed between the curved wall of the slip-ring cover and sidewalls of the brush holder when the brush holder is connected to the slip-ring cover. Preferably, the flat walls of the slip-ring cover are extended to form gaps between the brush holder and extended portions of the flat walls. The ventilation openings and the gaps are formed to be able to communicate with each other.

When the brush holder is positioned downward of the slip-rings so that the brushes are pushed up toward the slip-rings, the curved wall of the slip-ring cover covers the slip-rings from upward, and the openings are open to the downward direction. Therefore, water is prevented from entering into the brush device through the openings. Since the openings are formed at the sides of the slip-rings along the axial direction of the alternator, an axial length of the brush device can be made short. Since the brush holder is coupled to the slip-ring cover by making engagement between the projections formed on the brush holder and the through-holes formed in the slip-ring cover, both are easily connected to each other at a correct position.

Other objects and features of the present invention will become more readily apparent from a better understanding of the preferred embodiment described below with reference to the following drawings.

DETAILED DESCRIPTION OF THE PREFERRED EMBODIMENT

Figure 1:
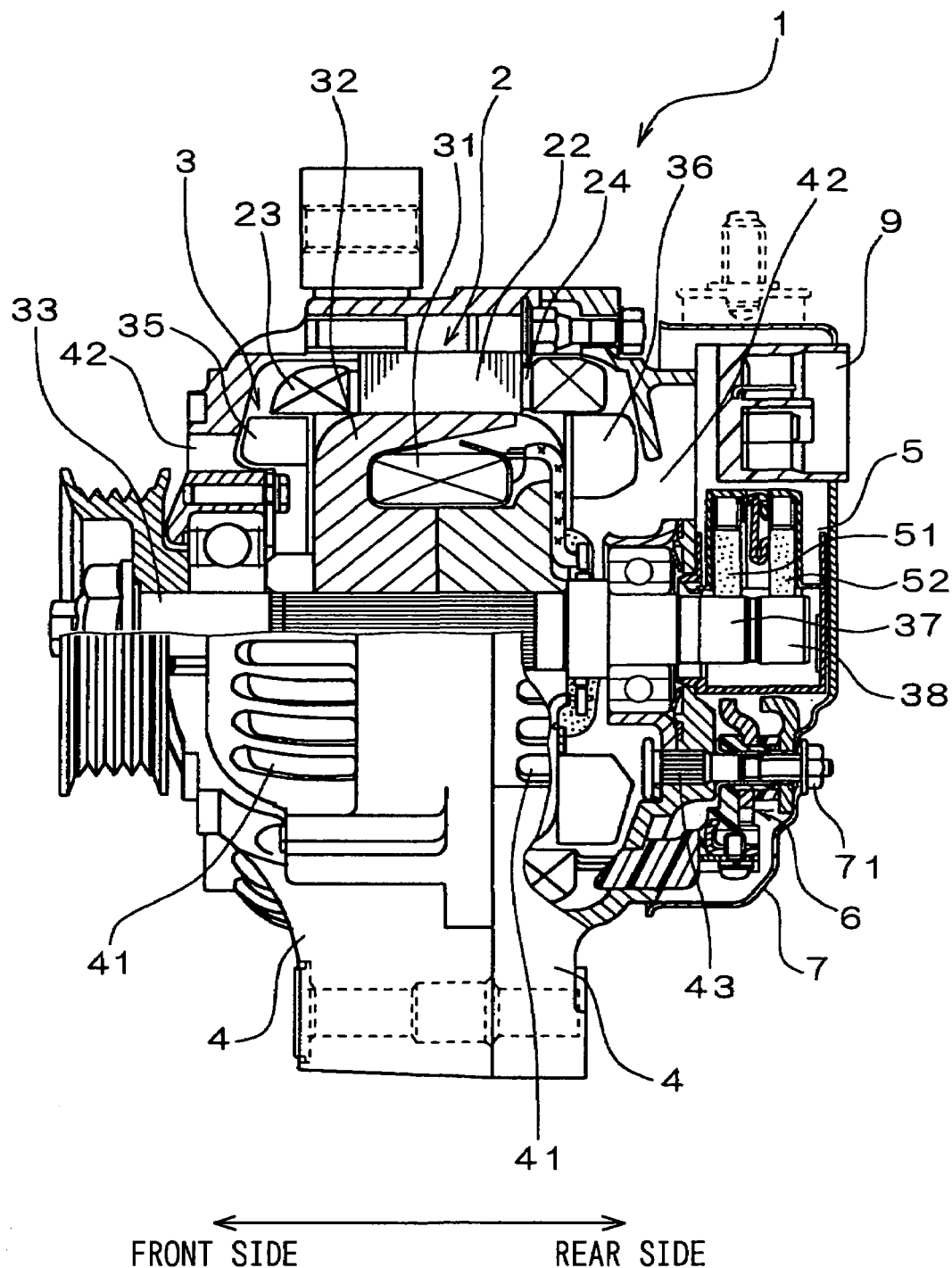
FIG. 1 is a cross-sectional view showing an automotive alternator having a brush device according to the present invention.

A preferred embodiment of the present invention will be described with reference to FIGS. 1-13. First, referring to FIG. 1, an entire structure of an automotive alternator will be described. The alternator 1 includes a stator 2, a rotor 3, frames 4, a brush device 5, a rectifier 6, a rear cover 7, an IC regulator 9 and other associated components. The stator 2 is composed of a stator core 22, a three-phase stator winding 23, and insulators 24 insulating the stator winding 23 from the stator core 22.

The rotor 3 is composed of a pair of pole cores 32 and a field coil 31 coaxially wound on the pole cores 32. Each pole core 32 has six claws, and the field coil 31 is sandwiched between the pair of pole cores 32. The pair of pole cores 32 is fixedly connected to a rotor shaft 33. A cooling fan 35 is connected to the rear side pole core 32 by welding or the like. The front side and the rear side are shown in FIG. 1. The cooling fan 35 sucks air from the frond side and blows out the air in both the axial and the radial directions. Similarly, another cooling fan 36 is connected to the rear pole core 32 by welding or the like. The cooling fan 36 sucks air from the rear side and blows out the air in the radial direction. A pair of slip-rings 37, 38 are formed at the rear end of the rotor shaft 33. Excitation current is supplied to the field coil 31 through the brush device 5 and the slip-rings 37, 38 which are electrically connected to the field coil 31.

The stator 2 is held between a pair of frames 4 (a front frame and a rear frame), and the rotor 3 is rotatably supported by the pair of frames 4, forming a small air gap between the stator 2 and the rotor 3. The frames 4 include outlet windows 41 from which air for cooling axial ends of the stator winding 23 sticking out from the stator core 22 is blown out. The frames 4 also include inlet windows 42 from which cooling air is sucked in.

Figure 2:
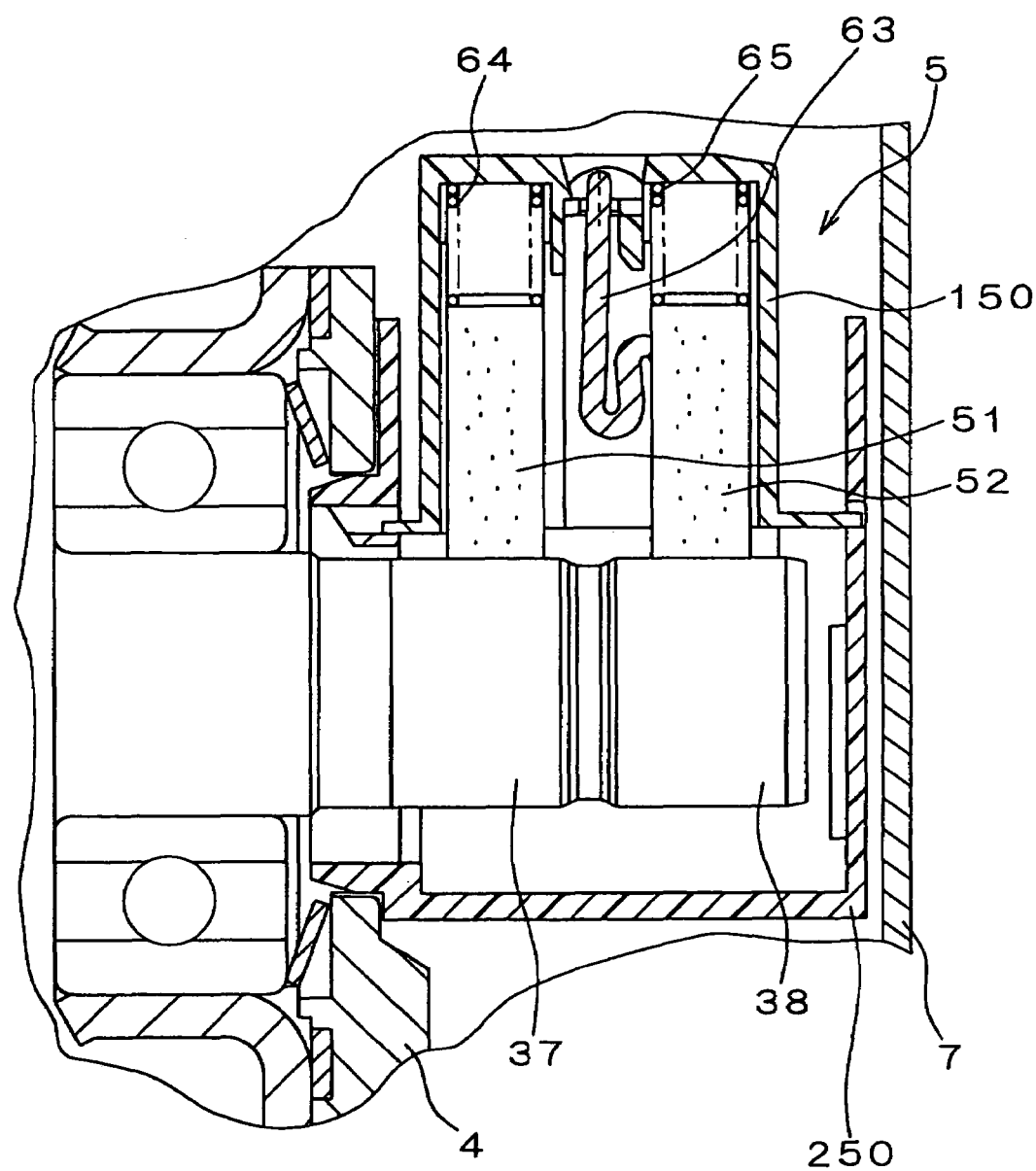
FIG. 2 is a cross-sectional view showing the brush device in an enlarged scale.
Figure 3:
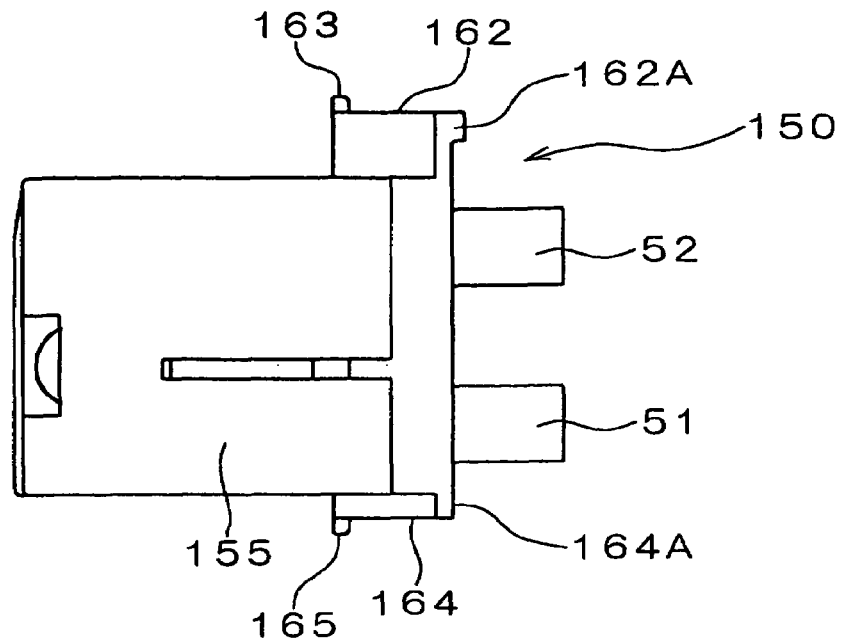
FIG. 3 is a side view showing a brush holder used in the brush device.
Figure 4:
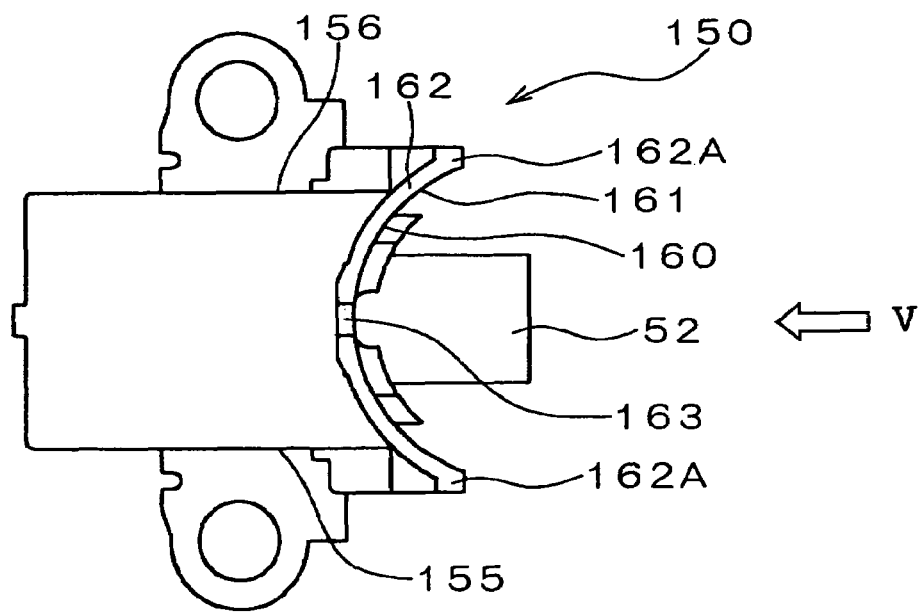
FIG. 4 is a rear view (viewed from the rear side shown in FIG. 1) showing the brush holder.

The brush device 5 includes a pair of brushes 51, 52 supported in a brush holder 150, and a slip-ring cover 250 (refer to FIG. 2). The pair of brushes 51, 52 slidably contact the slip-rings 37, 38 for supplying exciting current to the field coil 31. In this particular embodiment, the brush device 5 is installed in the alternator 1 so that the brushes 51, 52 are positioned downward of the slip-rings 37, 38 when the alternator 1 is mounted on an automobile. The rectifier 6 is connected to the three-phase stator winding 23 and rectifies alternating current generated in the stator winding 23 into a direct current. The rear cover 7 is connected to the rear frame 4 to cover and protect the brush device 5, the rectifier 6 and the IC regulator 9 mounted outside of the rear frame 4. The rear cover 7 is connected to the rear frame 4 by fastening a metallic nut 71 to a bolt 43 extending from the rear frame 4. The rectifier 6 is sandwiched between the rear frame 4 and the rear cover 7.

Referring to FIGS. 2-13, the brush device 5 including the brush holder 150, in which brushes 51, 52 are supported, and the slip-ring cover 250 will be described in detail. As shown in FIG. 2, the pair of brushes 51, 52 supported in the brush holder 150 are biased against the slip-rings 37, 38 by the springs 64, 65 so that the brushes 51, 52 slidably contact the slip-rings 37, 38. Electric current is supplied to the brushes 51, 52 through respective pigtails 63. The slip-ring cover 250 covers the slip-rings 37, 38 as shown in FIG. 2. Both of the brush holder 150 and the slip-ring cover 250 are made of a resin material.

Figure 5:
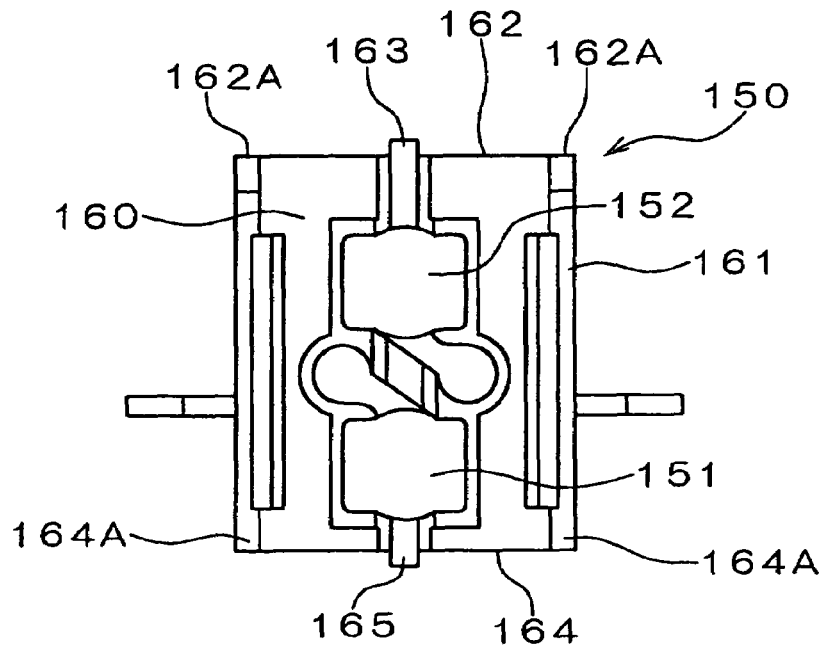
FIG. 5 shows the brush holder viewed in direction V shown in FIG. 4.

The brush holder 150 is substantially box-shaped, and a pair of spaces 151, 152 for holding brushes are open to an inner wall 160 of the brush holder 150 (refer to FIG. 5). A peripheral wall 161 extending from the inner wall 160 in the axial direction of the rotor shaft 33 is formed integrally with the inner wall 160. The peripheral wall 161 has a circular surface having a substantially constant radius from the rotational center of the rotor shaft 33 when the brush device 5 is mounted on the alternator 1. At a center of rear end 162 of the peripheral wall, which is positioned at the rear side of the alternator 1, a projection 163 is formed. Similarly, another projection 165 is formed at a center of front end 164 of the peripheral wall, which is positioned at the front side.

Figure 6:
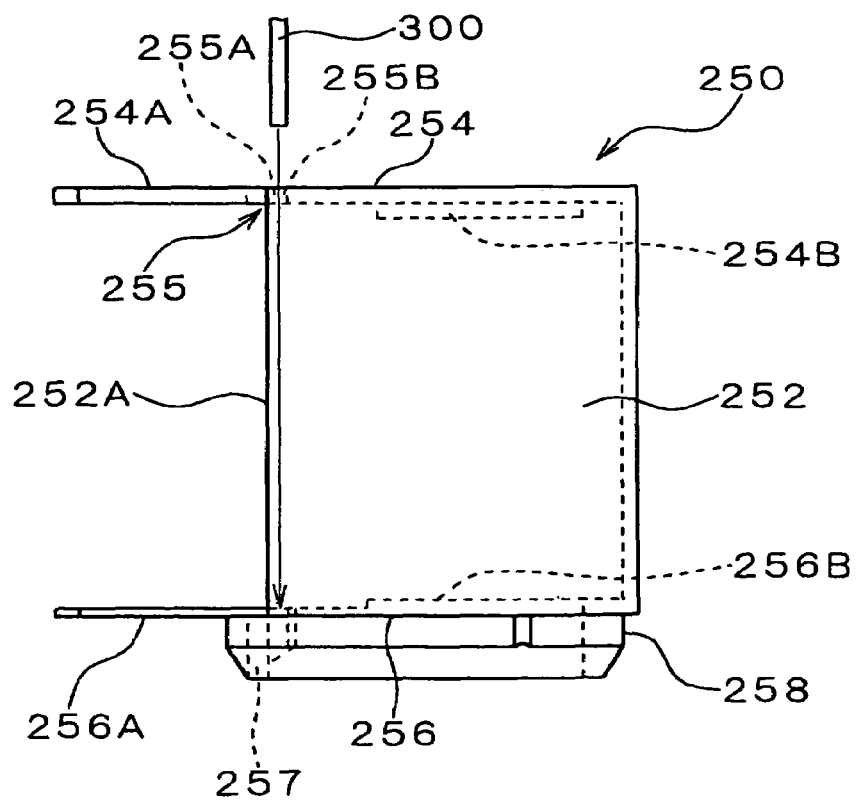
FIG. 6 is a side view showing a slip-ring cover used in the brush device.
Figure 7:
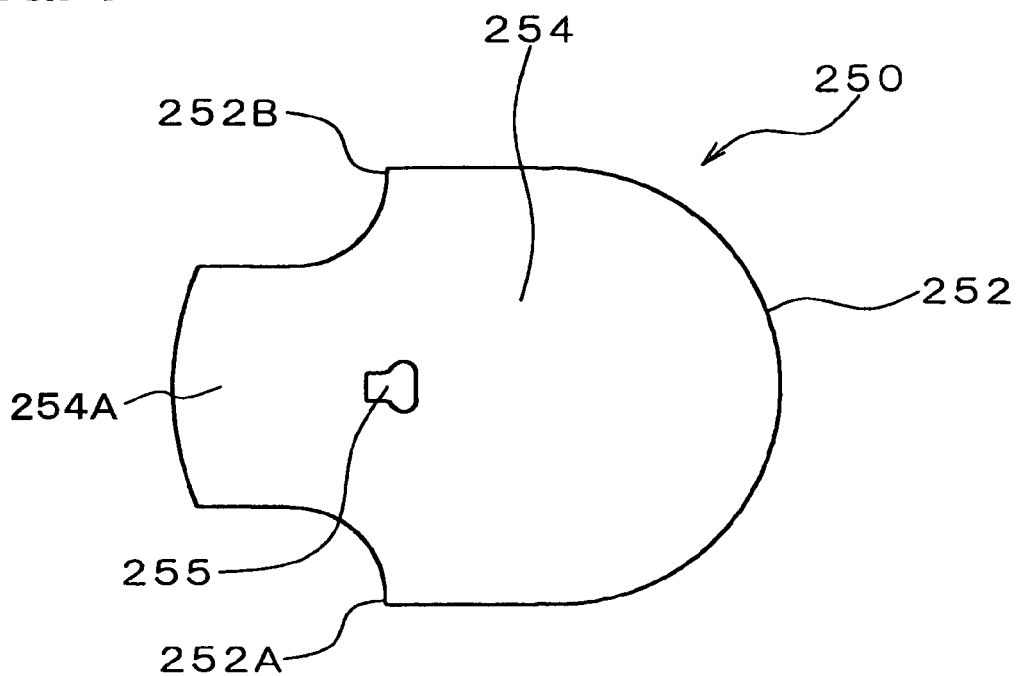
FIG. 7 is a rear view showing the slip-ring cover.
Figure 8:
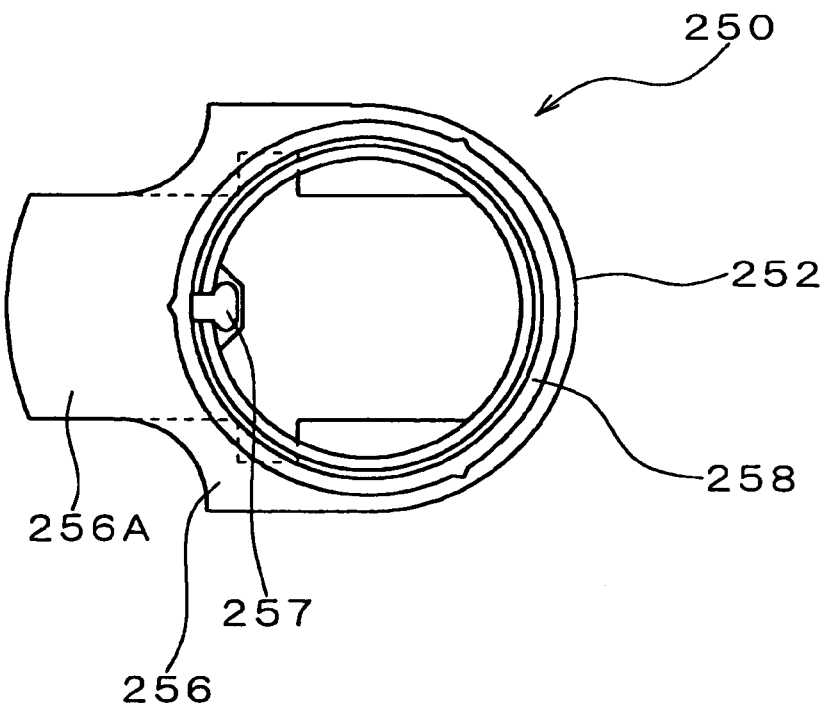
FIG. 8 is a front view (viewed from the front side shown in FIG. 1) showing the slip-ring cover.

As shown in FIGS. 6-8, the slip-ring cover is composed of a curved wall 252 covering the peripheral outside of the slip-rings 37, 38, a rear flat wall 254 closing the rear axial end of the curved wall 252, and a front flat wall 256 closing the front axial end of the curved wall 252. A cross-section of the curved wall 252 on a plane perpendicular to the axial direction is U-shaped, and ends 252A, 252B of the curved wall 252 extend to a position overlapping the sidewalls 155, 156 of the brush holder 150. A width between both ends 252A, 252B (refer to FIG. 7) is wider than a width between the sidewalls 155, 156 of the brush holder 150. When the brush holder 150 is connected to the slip-ring cover 250, openings C1 are formed between the slip-ring cover 250 and the brush holder 150 (refer to FIG. 10).

Figure 13:
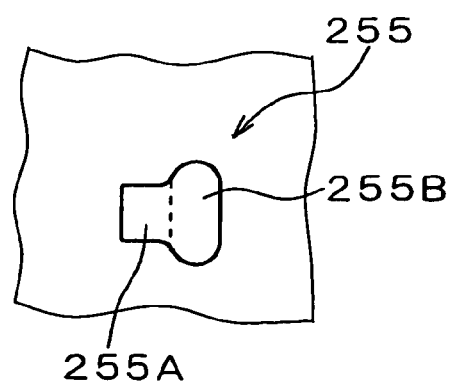
FIG. 13 is a partial view showing a through-hole formed in a flat wall of the slip-ring cover.

As shown in FIG. 7, the rear flat wall 254 covering the axial rear end of the curved wall 252 is extended to form an extended portion 254A corresponding to the shape of the brush holder 150. A through-hole 255 to be engaged with the projection 163 of the brush holder 150 is formed in the rear flat wall 254. As shown in FIG. 8, the front flat wall 256 having a front flange 258, through which the rotor shaft 33 extends into the slip-ring cover 250, is extended to form an extended portion 256A corresponding to the shape of the brush holder 150. A through hole 257 to be engaged with the projection 165 of the brush holder 150 is formed in the front flat wall 256. As shown in FIG. 13, the through-hole 255 is composed of a square portion 255A and an oval portion 255B, connected to each other. The other through-hole 257 has the same shape as that of the through-hole 255. The front flange 258 extends to the front side toward the rear frame 4, and an outer diameter of the front flange 258 are substantially equal to a diameter of a hole of the rear frame 4 through which the rotor shaft 33 extends.

Figure 9:
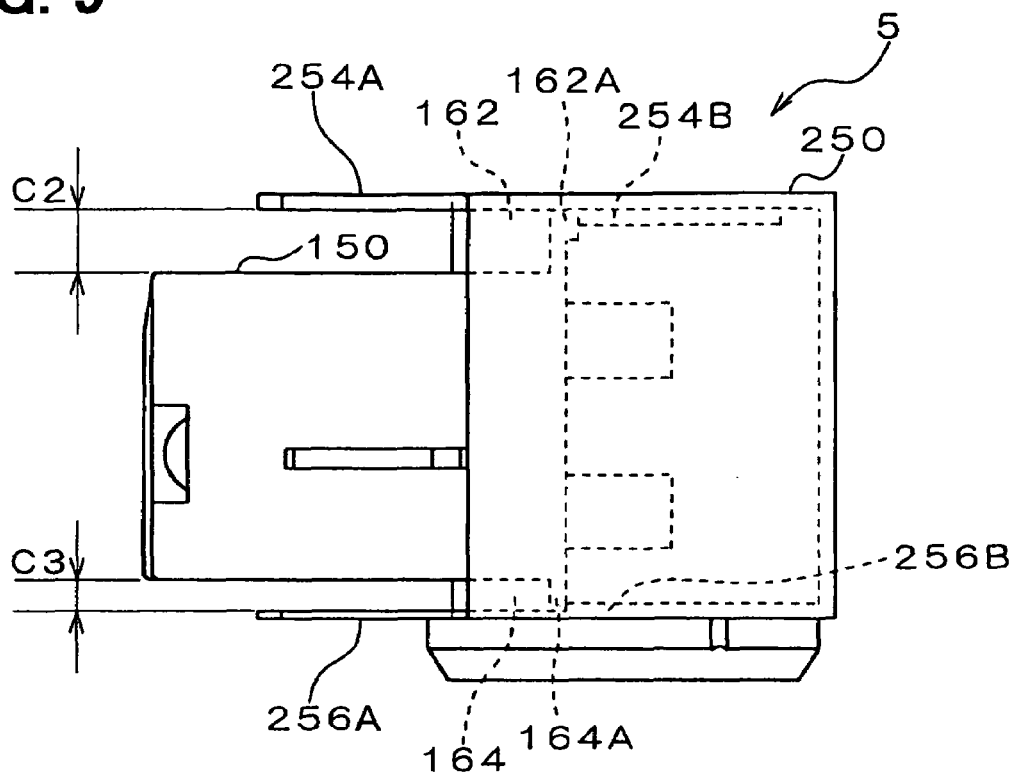
FIG. 9 is a side view showing the brush device consisting of the brush holder and the slip-ring cover.
Figure 10:
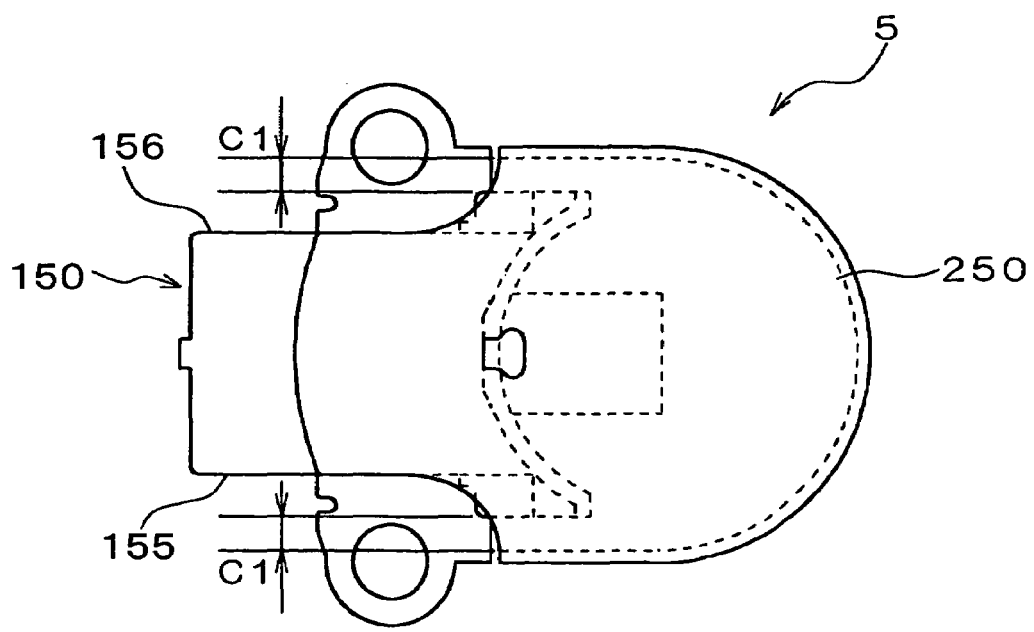
FIG. 10 is a rear view showing the brush device.

As shown in FIGS. 6 and 9, a stepped portion 254B to be abutted with an abutting end 162A of the brush holder 150 when the brush holder 150 is connected to the slip-ring cover 250 is formed on the rear flat wall 254. Similarly, a stepped portion 256B to be abutted with an abutting end 164A of the brush holder 150 is formed on the front flat wall 256. When the brush holder 150 is inserted into the slip-ring cover 250 as shown in FIG. 11, the abutting ends 162A, 164A abut the stepped portions 254B, 256B, respectively, thereby determining the position of the brush holder 150 relative to the slip-ring cover 250.

Figure 11:
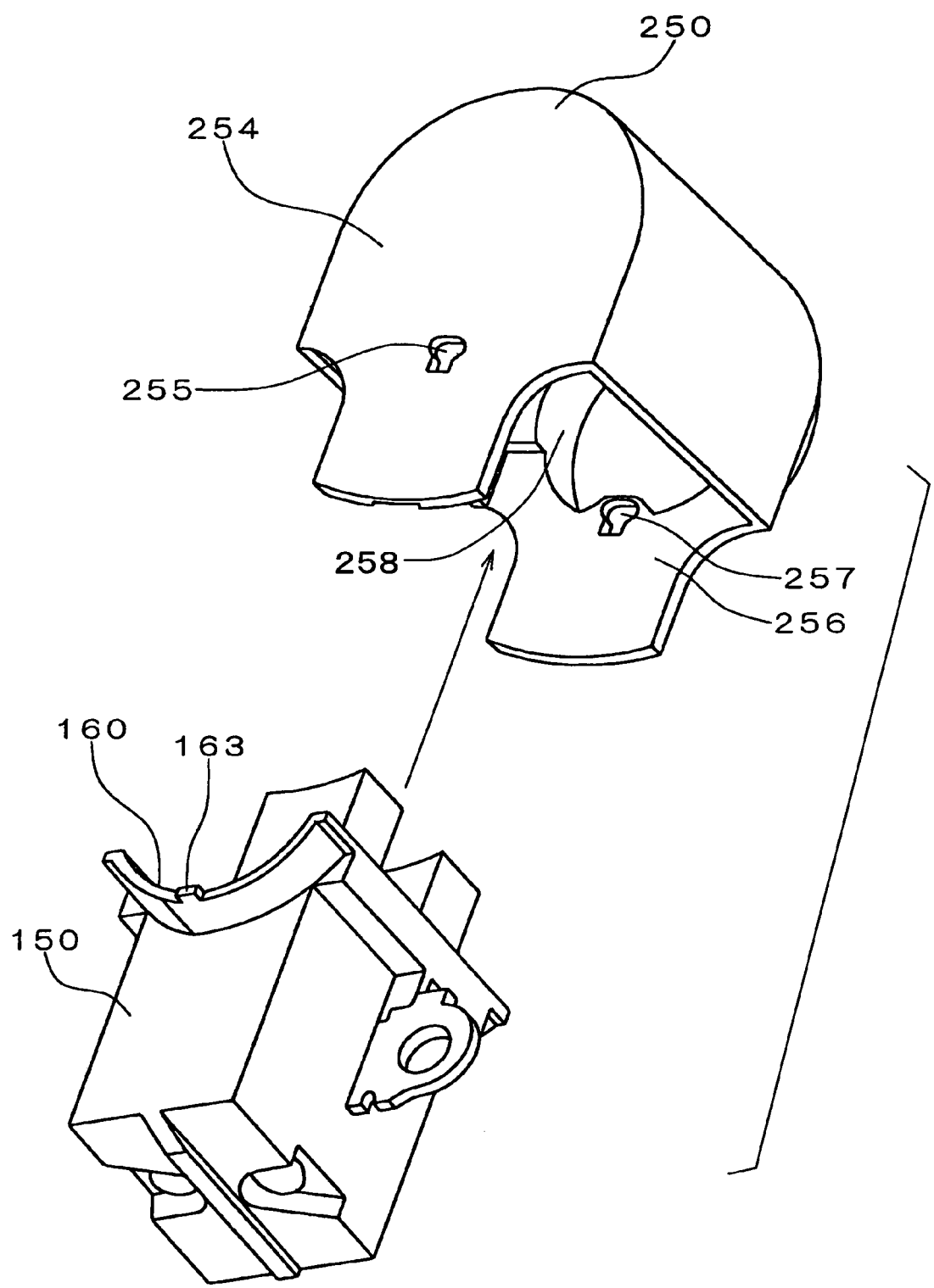
FIG. 11 is a perspective view showing a direction in which the brush holder is connected to the slip-ring cover.
Figure 12:
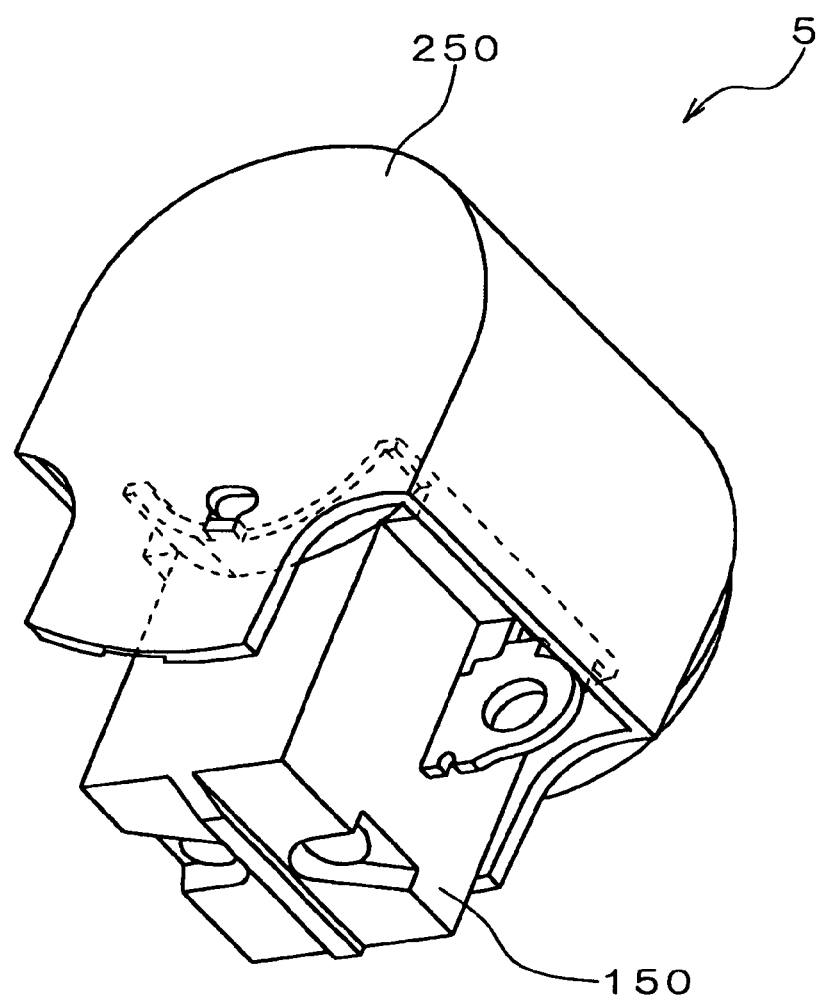
FIG. 12 is a perspective view showing the brush device.

FIGS. 9-12 show the brush device 5 formed by connecting the brush holder 150 to the slip-ring cover 250. As shown in FIG. 11, the brush holder 150 is inserted into the slip-ring cover 250. At the same time when the abutting portions 162A, 164A of the brush holder 150 abut the stepped portions 254B, 256B of the slip-ring cover 250, the projections 163, 165 of the brush holder 150 engage with the through-holes 255, 257 of the slip-ring cover 250. Thus, the brush holder 150 is connected to the slip-ring cover 250, as shown in FIG. 12.

The rear flat wall 254 of the slip-ring cover 250 contacts only the rear end 162 of the peripheral wall 161 of the brush holder 150, and thereby a gap C2 is formed between the extended portion 254A of the rear flat wall 254 and the side of the brush holder 150, as shown in FIG. 9. Similarly, the front flat wall 256 contacts only the front end 164 of the peripheral wall 161, and thereby another gap C3 is formed between the extended portion 256A of the front flat wall 256 and the side of the brush holder 150. Both gaps C2 and C3 communicate with the openings C1 formed between the sidewalls 155, 156 of the brush holder 150 and the curved wall 252 of the slip-ring cover 250. In other words, the gaps C2, C3 continue to the openings C1 along the outer periphery of the brush holder 150.

Before the brush holder 150 is inserted into the slip-ring cover 250, a stopper bar 300 is inserted into the oval portion 255B of the through-hole 255 until the stopper bar 300 reaches the other through-hole 257. Thus, the stopper bar 300 is held in both oval portions of the through-holes 255, 257. When the projections 163, 165 of the brush holder 150 engage with the square portions 255A of through-holes 255, 257, the brushes 51, 52 supported in the brush holder 150 are pushed back into the brush holder by the stopper bar 300 against the biasing force of the springs 64, 65. Therefore, the brushes 51, 52 are substantially fully contained in the brush holder 150 when the brush device 5 is formed by connecting the brush holder 150 to the slip-ring cover 250.

The brush device 5 is assembled to the alternator 1 to cover the slip-rings 37, 38, while keeping the brushes 51, 52 at the position stopped by the stopper bar 300. After the brush device 5 is mounted, the stopper bar 300 is taken out. In this manner, the brush device 5 is easily assembled to the alternator 1, avoiding contact between the brushes 51, 52 and the slip-rings 37, 38 in the assembling process.

The following advantages are attained in the present invention. When the brushes 51, 52 are positioned downward of the slip-rings 37, 38, the openings C1 between the brush holder 150 and the slip-ring cover 250 are open to the downward direction (in the gravitational direction). Therefore, foreign particles including water entering the openings C1 from the upward direction are prevented. Since the openings C1 are fixedly formed between the brush holder 150 and the slip-ring cover 250, the openings C1 can be surely maintained regardless of mounting conditions of the brush device 5. Since the openings C1 is formed along the outer periphery of the slip-rings 37, 38 and in parallel to the axial direction, the axial length of the brush device 5 can be made short.

The curved wall 252 is extended to a position overlapping the brush holder 150. Therefore, the openings C1 can be made sufficiently wide while preventing water from sneaking into the brush device 5 due to interfacial tension. The rear end 162 and the front end 164 of the peripheral wall 161 abut the rear flat wall 254 and the front flat wall 256, respectively. Therefore, the axial length of the brush device 5 is further shortened. The extended portions 254A, 256A of the rear and front flat walls 254, 256 face the sides of the brush holder 150, thereby forming the gaps C2, C3. The gaps C2, C3 prevent water from sneaking into the inside space of the brush device 5 due to interfacial tension. Further, since the openings C1 and the gaps C2, C3 are formed to be continuous, water is prevented from sneaking into the brush device 5 along the rear and the front flat walls 254, 256.

In the process of connecting the brush holder 150 to the slip-ring cover 250, the position of the brush holder 150 relative to the slip-ring cover 250 is automatically set by the abutting ends 162A, 164A of the brush holder 150 and the stepped portions 254B, 256B of the slip-ring cover 250. Further, the brush holder 150 is easily coupled to the slip-ring cover 250 by engagement of the projections 163, 165 with the through-holes 255, 257. The brushes 51, 52 are pushed in the brush holder 150 by the stopper bar 300 when the brush device 5 is assembled to the alternator 1. Therefore, the brush device 5 is easily assembled to the alternator 1 without being interfered by the brushes 51, 52.

Figure 14:
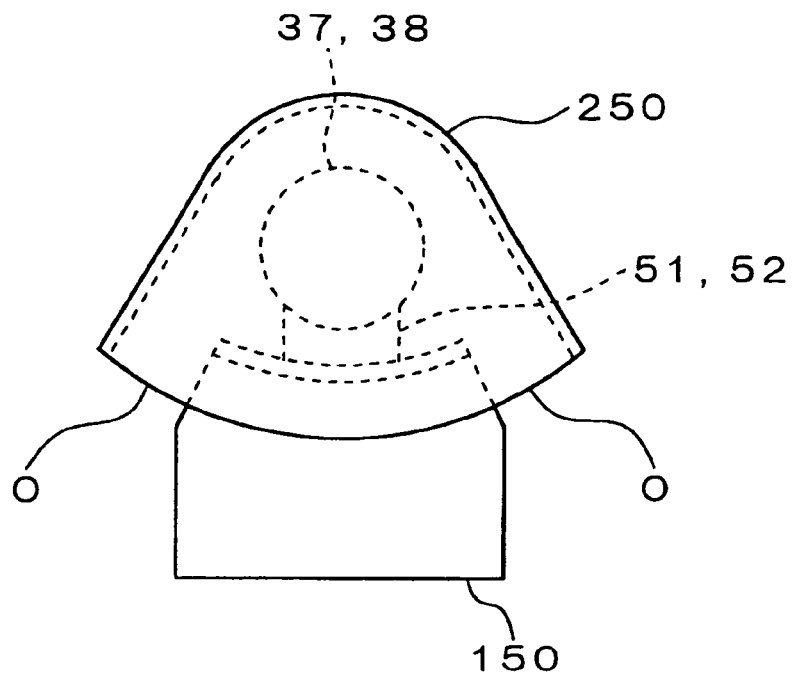
FIG. 14 is a rear view showing a modified form of a brush device, in which a curved wall of a slip-ring cover does not open in a direction parallel to a longitudinal direction of brushes.
Figure 15:
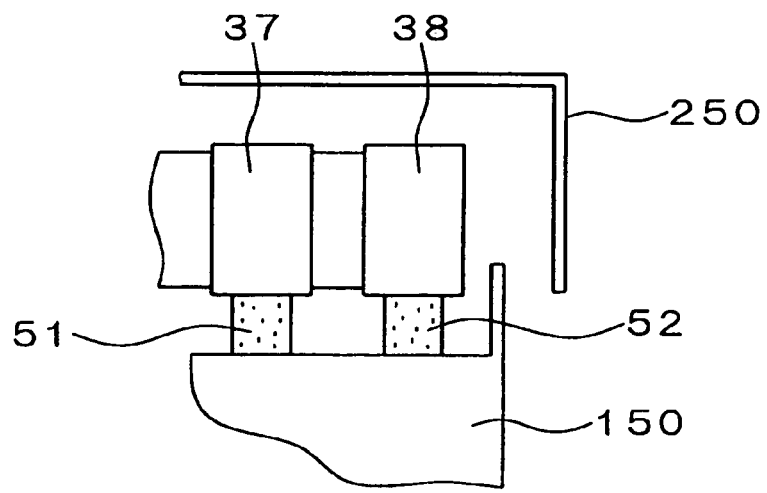
FIG. 15 is a side view showing another modified form of a brush device, in which an opening is formed also at an axial rear end of the brush device.

The present invention is not limited to the embodiment described above, but it maybe variously modified. For example, the openings "O" between the brush holder 150 and the slip-ring cover 250 may open to a direction which is not parallel to the longitudinal direction of the brushes 51, 52 that are pushed against the slip-rings 37, 38, as shown in FIG. 14. The openings between the brush holder 150 and the slip-ring cover 250 may be formed to cover only a part of the axial length of the slip-rings 37, 38. It may not be necessary to form the openings C1 at both sides of the slip-rings 37, 38. Only one opening may be formed at one side of the slip-rings. As shown in FIG. 15, an opening may be formed at an axial end of the brush device 5 in addition to or in place of the side openings C1.

Figure 16:
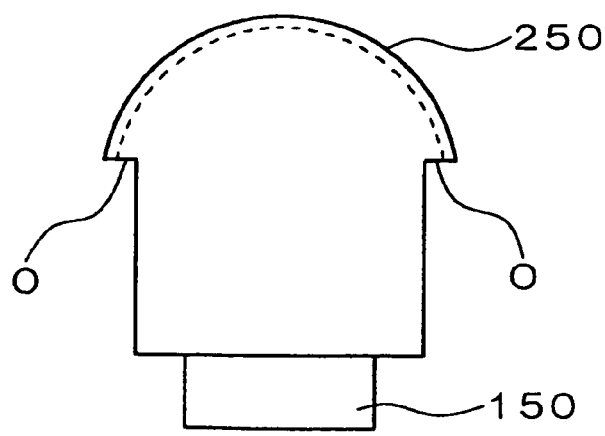
FIG. 16 is a rear view showing yet another modified form of a brush device, in which an opening is formed in a slip-ring cover.

The opening may be formed in the brush holder 150 or the slip-ring cover 250, or both. FIG. 16 shows an example in which the openings "O" are formed in the slip-ring cover 250. In the case where the slip-ring cover 250 is formed as an integral part of the rear frame 4, the opening may be formed between the brush holder 150 and the rear frame 4.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive alternator comprising:
   slip-rings connected to a rotor shaft of the alternator;
   a brush holder for supporting brushes slidably contacting the slip-rings;
   a slip-ring cover for covering the slip-rings, the slip-ring cover being connected to the brush holder; and
   an opening for supplying air to the slip-rings, wherein:
   the slip-ring cover is positioned upward of the slip-rings while the brush holder is positioned downward of the slip-rings;
   the opening is open toward a downward direction of the slip-rings so that an inside of the slip-ring cover is directly exposed outside through the opening;
   the brush holder and the slip-ring cover form a unitary brush device;
   the slip-ring cover includes a curved wall surrounding an outer circumference of the slip-rings;
   the opening is formed between the curved wall and the brush holder facing the curved wall;
   the slip-ring cover includes a pair of flat walls connected to the curved wall, the flat walls being perpendicular to the rotor shaft;
   each flat wall contacts the brush holder and is extended from a position where the flat wall contacts the brush holder, forming an extended portion; and
   a gap is formed between the extended portion and the brush holder.

2. The automotive alternator as in claim 1, wherein:
the opening and the gap are continuous along an outer periphery of the brush holder.

3. The automotive alternator as in claim 1, wherein:
a through-hole is formed in each of the flat walls at a position where the brush holder contacts the flat wall; and
a pair of projections are formed on the brush holder so that each projection engages with the through-hole.

4. The automotive alternator as in claim 3, wherein:
the position of each through-hole corresponds to a position where tips of brushes are located when the brushes are pushed into the brush holder and contained therein; and
the through-holes serve as holes into which a stopper bar is inserted to stop the brushes at the position where they are contained in the brush holder.

* * * * *